United States Patent
Orevi et al.

(10) Patent No.: US 11,960,606 B2
(45) Date of Patent: Apr. 16, 2024

(54) SYSTEM AND METHOD FOR PROTECTING AGAINST DATA STORAGE ATTACKS

(71) Applicant: Check Point Software Technologies Ltd., Tel Aviv (IL)

(72) Inventors: Liran Orevi, Rishon-LeZion (IL); Haggai David, Petah-Tikva (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 258 days.

(21) Appl. No.: 17/703,210

(22) Filed: Mar. 24, 2022

(65) Prior Publication Data

US 2023/0325503 A1    Oct. 12, 2023

(51) Int. Cl.
*G06F 21/56* (2013.01)

(52) U.S. Cl.
CPC ...... *G06F 21/568* (2013.01); *G06F 2221/033* (2013.01)

(58) Field of Classification Search
CPC ........ G06F 21/55; G06F 21/56; G06F 21/568; G06F 21/554; G06F 3/064; G06F 11/1446; G06F 12/14; G06F 2221/033
See application file for complete search history.

(56) References Cited

U.S. PATENT DOCUMENTS

| | | | | |
|---|---|---|---|---|
| 7,472,420 B1 * | 12/2008 | Pavlyushchik | ......... | G06F 21/56 713/188 |
| 7,523,343 B2 * | 4/2009 | Leis | ..................... | G06F 11/0793 714/5.11 |
| 7,694,191 B1 * | 4/2010 | Bono | ..................... | G06F 11/004 714/48 |
| 9,009,829 B2 * | 4/2015 | Stolfo | ................... | G06F 21/552 726/23 |
| 9,317,686 B1 * | 4/2016 | Ye | .......................... | G06F 21/568 |
| 9,405,756 B1 * | 8/2016 | Xavier | ................ | G06F 11/1446 |
| 10,193,918 B1 * | 1/2019 | Patton | ................... | G06F 21/566 |

(Continued)

FOREIGN PATENT DOCUMENTS

EP    3568791 B1 *   10/2021    ............. G06F 21/54

OTHER PUBLICATIONS

D. Min et al., "Amoeba: An Autonomous Backup and Recovery SSD for Ransomware Attack Defense," in IEEE Computer Architecture Letters, vol. 17, No. 2, pp. 245-248, Jul. 1-Dec. 2018, doi: 10.1109/LCA.2018.2883431. (Year: 2018).*

(Continued)

*Primary Examiner* — Michael Simitoski
(74) *Attorney, Agent, or Firm* — Renner, Otto, Boisselle & Sklar, LLP

(57) ABSTRACT

A system, method, and device are provided for detecting and mitigating a storage attack at the block level by generating canary blocks by marking blocks of data (referred to as memory blocks) such that other programs do not modify these canary blocks that are monitored to detect data storage attacks that attempt to modify the canary blocks and/or by monitoring statistical and behavioral features of activities over blocks, whether they can be modified by other programs or not. The system and method also backup the memory blocks by backing up memory blocks as they are modified. When a data storage attack is detected, the attack is stopped, and the files are remediated using the backup of the affected memory blocks.

20 Claims, 3 Drawing Sheets

(56) References Cited

U.S. PATENT DOCUMENTS

| | | | |
|---|---|---|---|
| 10,628,585 B2* | 4/2020 | Tamir | G06F 16/128 |
| 10,831,888 B2* | 11/2020 | Formato | G06F 21/565 |
| 10,938,854 B2* | 3/2021 | Strogov | H04L 63/1416 |
| 11,080,397 B2* | 8/2021 | Rinaldi | G06F 21/566 |
| 11,089,056 B2* | 8/2021 | Schütz | G06F 21/566 |
| 11,099,946 B1* | 8/2021 | Chopra | G06F 11/1451 |
| 11,436,328 B1* | 9/2022 | Strogov | G06F 16/128 |
| 11,748,475 B1* | 9/2023 | Berk | G06F 21/564 726/22 |
| 2007/0074048 A1* | 3/2007 | Rudelic | G06F 12/14 713/193 |
| 2012/0060217 A1* | 3/2012 | Sallam | G06F 21/564 726/23 |
| 2012/0255012 A1* | 10/2012 | Sallam | G06F 21/554 726/23 |
| 2015/0058987 A1* | 2/2015 | Thure | G06F 21/565 726/23 |
| 2016/0019122 A1* | 1/2016 | Johnson, III | G06F 11/3055 714/19 |
| 2016/0085634 A1* | 3/2016 | Gardner | G06F 16/137 713/190 |
| 2016/0378988 A1* | 12/2016 | Bhashkar | G06F 21/566 726/24 |
| 2017/0140156 A1* | 5/2017 | Gu | G06F 11/1458 |
| 2017/0324755 A1* | 11/2017 | Dekel | G06F 21/60 |
| 2018/0248896 A1* | 8/2018 | Challita | G06F 21/554 |
| 2018/0293379 A1* | 10/2018 | Dahan | G06F 21/568 |
| 2019/0087572 A1* | 3/2019 | Ellam | G06F 21/12 |
| 2019/0188380 A1* | 6/2019 | Animireddygari | G06F 21/568 |
| 2019/0228147 A1* | 7/2019 | Formato | H04L 63/145 |
| 2019/0266327 A1* | 8/2019 | Satpathy | G06F 21/6218 |
| 2021/0011807 A1* | 1/2021 | Rosenthal | G06F 11/1469 |
| 2021/0012002 A1* | 1/2021 | Rosenthal | G06F 11/1448 |
| 2021/0312046 A1* | 10/2021 | Hicks | G06F 21/566 |
| 2021/0319104 A1* | 10/2021 | Jagannathan | G06F 3/0604 |
| 2022/0027471 A1* | 1/2022 | Levy | G06F 21/6218 |
| 2022/0058281 A1* | 2/2022 | Gryting | G06F 3/065 |
| 2022/0253524 A1* | 8/2022 | Gadient | G06F 21/554 |
| 2023/0113507 A1* | 4/2023 | Matsugami | G06F 12/0868 711/154 |
| 2023/0229761 A1* | 7/2023 | Laplante | G06F 21/54 726/22 |

OTHER PUBLICATIONS

S. Demesie Yalew, G. Q. Maguire, S. Haridi and M. Correia, "Hail to the Thief: Protecting data from mobile ransomware with ransomsafedroid," 2017 IEEE 16th International Symposium on Network Computing and Applications (NCA), Cambridge, MA, USA, 2017, pp. 1-8, doi: 10.1109/NCA.2017.8171377. (Year: 2017).*

* cited by examiner

SYSTEM AND METHOD FOR PROTECTING AGAINST DATA STORAGE ATTACKS

TECHNICAL FIELD

The present disclosure relates generally to computer security and more particularly to detecting and protecting stored data from malicious attacks.

BACKGROUND

Ransomware is malware designed to deny a user or organization access to files on their computer. By encrypting these files and demanding a ransom payment for the decryption key, the malware places organizations in a position where paying the ransom is the easiest and cheapest way to regain access to their files.

Ransomware has quickly become the most prominent and visible type of malware. Recent ransomware attacks have impacted hospitals' ability to provide crucial services, crippled public services in cities, and caused considerable damage to various organizations.

To be successful, ransomware needs to gain access to a target system, encrypt the files there, and demand a ransom from the victim. Ransomware, like any malware, can gain access to an organization's systems in a number of different ways including phishing emails, using stolen or guessed login credentials, or using unpatched security vulnerabilities.

After ransomware has gained access to a system, it can begin encrypting its data. Lately such encryptions are performed not on file level but on block level. Those impose new challenges to defend against, as such encryption functionality may be supplied with the operating system, be already integrated with it, or otherwise already exist on the attacked system. Furthermore, often those encryptions capabilities enjoy high privileges that are often essential to operate on block level. Those mean that an attacker may often just need to use those already existing abilities to encrypt with an attacker-controlled key, and replace the original data with the encrypted version. Furthermore, because the actual encryption of blocks usually happens on high privileges it's often performed in kernel level, and thus it is very hard to monitor and to protect against. Many ransomware variants are cautious in their selection of the data to encrypt in order to ensure system stability. Some variants of malware will also take steps to delete backup and shadow copies of files in order to make recovery without the decryption key more difficult.

SUMMARY

One approach for detecting security breaches is to use a honeypot to draw an unauthorized user away from critical components of a networked service. Another approach is to incorporate a decoy application or content on a network device or one of the hardware components supporting a networked service. The decoy application or content can be something that an authorized user would not access. The decoy can be monitored and if accessed can trigger a response that can alert an administrator and/or block the unauthorized access.

While this approach may be successful at detecting directed access to individual files, it may not detect and prevent attacks of the volume (such as whole disk encryption). Many data storage attacks encrypt data at the block level as opposed to at the file level. At the file level, data is accessed by file name, which is translated into a block level identifier for reading and writing by the operating system's file system.

The present disclosure provides a system and method for detecting and mitigating a storage attack at the block level by monitoring specific memory blocks to detect data storage attacks and restoring other memory blocks modified by the detected storage attack.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
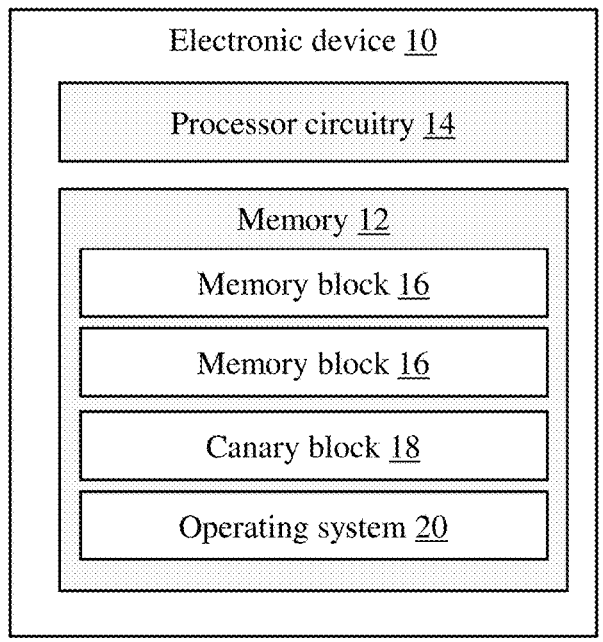
FIG. 1 is a block diagram of an embodiment of an electronic device for detecting and mitigating a storage attack at the block level.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a device, system, and method for detecting and mitigating a storage attack at the block level by generating canary blocks through marking memory blocks, such that the operating system does not modify these canary blocks. These canary blocks are then monitored to detect data storage attacks that attempt to modify the canary blocks. The device, system, and method also maintain a backup of the memory blocks by backing up memory blocks as they are modified. When a data storage attack is detected, the attack may be stopped, and the files are restored using the backup of the affected memory blocks.

According to a general embodiment shown in in FIG. 1, an electronic device 10 is presented for detecting and mitigating a storage attack at the block level. The electronic device 10 includes a memory 12 and processor circuitry 14. The memory 12 includes multiple memory blocks 16. The processor circuitry designates one or more of the memory blocks 16 as canary blocks 18, such that an operating system 20 does not use the canary blocks 18 (e.g., for storing electronic files 22). The processor circuitry 14 detects the storage attack by monitoring the canary blocks 18 to identify when one of the canary blocks 18 has been modified (referred to as a modified canary block 24). When the storage attack is detected by processor circuitry 14 based on the identification of the modified canary block 24, the processor circuitry 14 mitigates the storage attack (1) by identifying as modified memory blocks 26 the memory blocks 16 that were modified by the storage attack and (2) restoring the modified memory blocks 26 from a backup 28.

Figure 2:
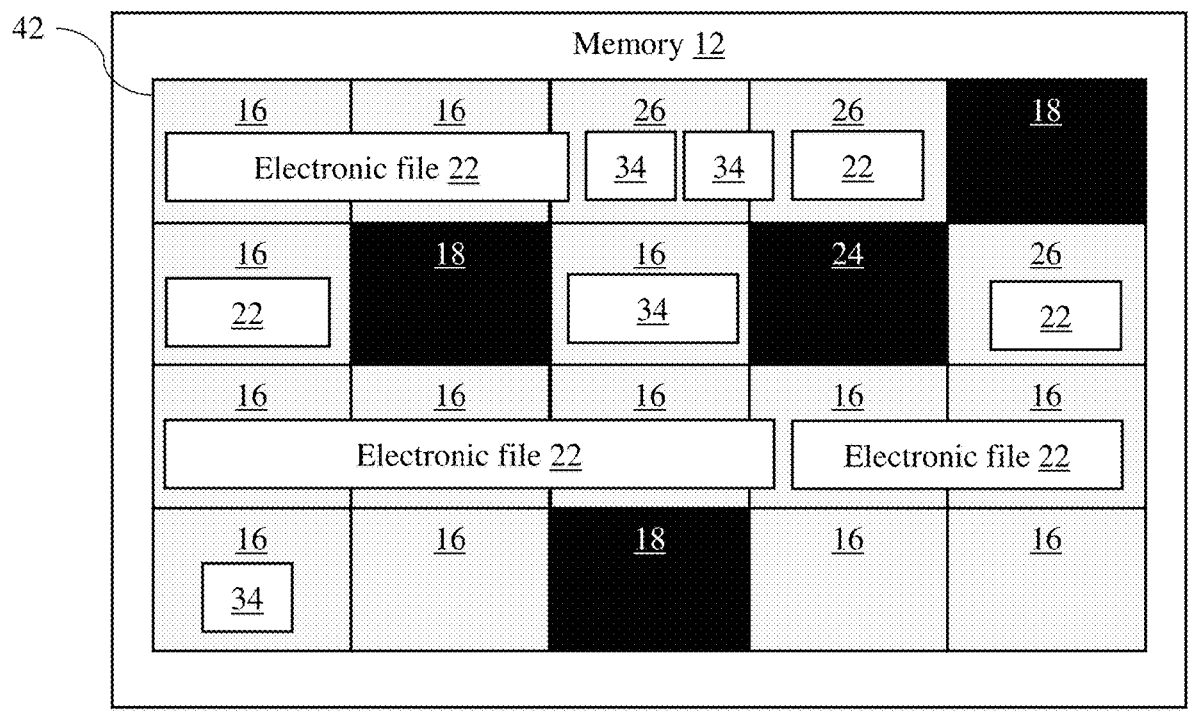
FIG. 2 is a schematic diagram of a memory including memory blocks storing electronic files and metadata.

As shown in the exemplary embodiment depicted in FIG. 2, the memory blocks 16 of the memory 12 are configured to store electronic files 22 and metadata 34 for the electronic files. The processor circuitry 14 may generate an incremental backup 28 of the memory blocks 16 by detecting modifications in the memory blocks 16 and storing a memory block backup 36 of the memory blocks 16 that have been modified. For example, the memory blocks 16 may be backed up periodically (e.g., once per day) or as the memory blocks are modified (e.g., within a number of minutes of the memory block 16 being modified). The processor circuitry 14 may then restore the memory block backup 36 of the modified memory blocks 26, such that the electronic files 22 and the metadata 34 stored in the modified memory blocks 26 are restored.

The processor circuitry 14 may identify a malicious process 40 that caused the modification to the modified canary block 24. For example, the processor circuitry 14 may use data from a driver 50 of the memory 12 to identify the malicious process 40 as the process that modified the canary block 18. The processor circuitry 14 may then identify the modified memory blocks 26 by determining the memory blocks 16 that were modified by the malicious process 40. In this example, the driver of the memory 12 may be used to determine the other memory blocks 16 modified by the identified malicious process 40.

The mitigation of the storage attack by the processor circuitry 14 may additionally include stopping the malicious process 40, such that the identified malicious process is prevented from further modifying the memory blocks 16. The stopping of the malicious process 40 by the processor circuitry 14 may be performed in any suitable manner.

The malicious process 40 may be any program, software, or series of actions or steps taken to perform a storage attack. For example, the malicious process 40 may be a kernel mode driver used to perform encryption in the system context (i.e., where there is no traditional operating system process object).

Figure 3:
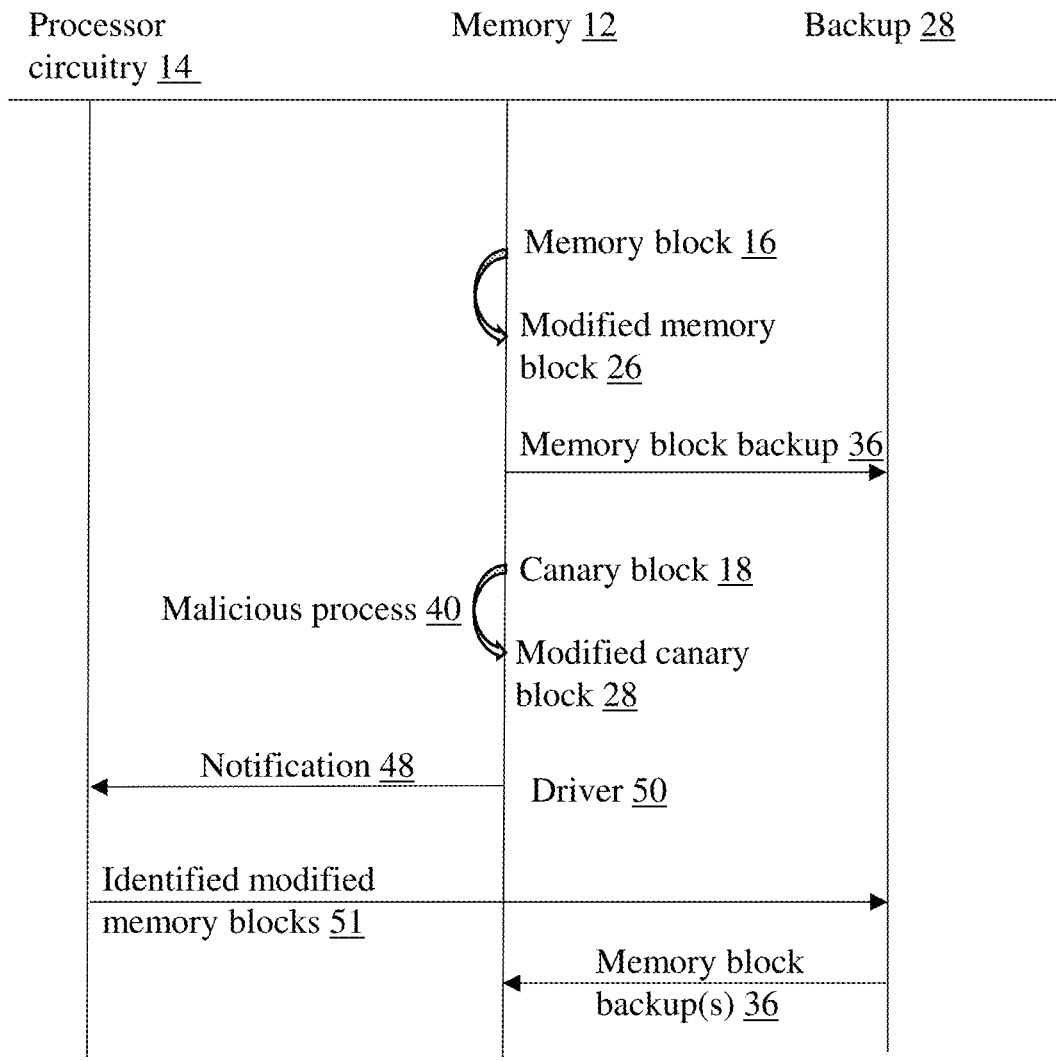
FIG. 3 is a ladder diagram depicting an exemplary operation of the electronic device.

Turning to FIG. 3, an exemplary flow of information between the memory 12, processor circuitry 14, and backup 28 is shown. At the top of FIG. 3, memory blocks 16 are modified (referred to as modified memory blocks 36). The backup 22 is then updated with a memory block backup 36 corresponding to the modified memory blocks 26. As shown, when a canary block 18 is modified by a malicious process 40 (referred to as a modified canary block 28), the processor circuitry 14 may receive a notification 48 from a driver 50. The process circuitry 14 may then determined the memory blocks 16 modified by the malicious process 40 and send an identifier 52 of the modified memory blocks to the backup 28. The memory block backups 36 of the backup 28 corresponding to the identifier 52 may then be used to restore the memory blocks 16 that were modified by the malicious process 40.

In one embodiment, the processor circuitry 14 may designate the canary blocks 18 by any suitable method that results in the canary blocks 18 being non-operable under normal circumstances so that other software may not use them and cause a false detection. That is, because the processor circuitry 14 monitors the canary blocks 18 for changes and interprets these changes as signifying a potential storage attack, the canary blocks 18 should be marked in a manner that results in the operating system 20 and/or other software not using the canary blocks 18 (e.g., not using the canary blocks 18 to store electronic files 22 or metadata 34). In one embodiment, the processor circuitry 14 designates the canary blocks 18 by at least one of marking the canary blocks 18 as bad blocks or by occupying the canary blocks 18 (e.g., storing electronic files 22 or metadata 34 in the canary blocks 18).

For example, many operating system variants include capabilities for marking memory blocks 16 as bad blocks (e.g., to identify disk sectors that were not performing well). By designating the canary blocks 18 by marking the canary blocks 18 as bad blocks, the operating system 20 will not use the canary blocks 18, but storage attacks will still attempt to modify the canary blocks 18.

Alternatively or additionally to marking the canary blocks 18 as bad blocks, a file or meta data may be created and stored in a canary block 18 so that the operating system will not use the canary block (i.e., because the memory block 16 is already storing a file). This results in the canary blocks 18 appearing as valid blocks, e.g., so that malicious software may not differentiate canary blocks 18 from other regular memory blocks 16.

In one embodiment, the canary blocks 18 may be chosen based on location in the memory 12 (e.g., on a physical disk of the memory 18). For example, the canary blocks 18 may be chosen to occupy memory blocks 16 that are not typically accessed by non-malicious software. These locations may be pre-determined based on hardware design, characteristics of the memory (such as layout and other volume characteristics), and analysis including statistical analysis. The statistical analysis may be performed based on observed behavior in other computer devices, the electronic device 10, behavior of known storage attacks, etc. This statistical analysis may be updated, such that the memory blocks 16 designated as canary blocks 18 changes with time. For example, the memory blocks 16 designated as canary blocks 18 may be chosen based on the memory blocks 16 most likely to be affected by malicious processes. In an alternative embodiment, the memory blocks 16 designated as canary blocks 18 may be randomly chosen.

The memory blocks 17 designated as canary blocks 18 may be static or dynamic (i.e., change) with time. For example, the memory blocks 17 designated as canary blocks 18 may be changed by the processor circuitry 14. The state of the canary blocks 18 may be monitored by the processor circuitry 14 using any suitable method, such as entropy, delta differences (i.e., comparison to a previous state measurement), by behavioral analysis, etc. As another example, the memory blocks 17 designated as canary blocks 18 may be changed (e.g., at a predetermined frequency) to reduce a likelihood of storage attacks skipping known memory blocks 16 to avoid detection.

The canary blocks 18 may be located at any location on the memory 12. In the embodiment shown in FIG. 2, the canary blocks 18 include one or more memory blocks 16 located at a beginning 42 of the memory 12. For example, the beginning of the memory 12 may be defined as the memory blocks located within an initial ten percent, 15 percent, or 20 percent of the memory. At least one or a certain percentage of the canary blocks 18 (e.g., at least 25%, 50%, 75%, or 90%) of the canary blocks 18 may be located towards a beginning 42 of the memory 12 to improve detection time of the storage attack. For example, if the storage attack begins by modifying the memory blocks 16 at the beginning 42 of the memory 12, then changes in the canary blocks 18 located at the beginning 42 of the memory 12 will be detected sooner than changes in the canary blocks 18 located towards an end of the memory 12. Alternatively or additionally, at least one of the canary blocks 18 may be located towards an end of the memory 12 to improve detection of storage attacks that begin by modifying the memory blocks 16 at the end of the memory 12.

In one embodiment, the processor circuitry 14 may monitor the canary blocks 18 to identify modified canary blocks 24 by storing an initial state (e.g., entropy) of each of the canary blocks at an initial time point. The processor circuitry 14 may then calculate a current state of each of the canary blocks 18 at a later time point. The processor circuitry 14 may then compare the current state and the initial state of each of the canary blocks. When the current state of a canary block 18 differs from the initial state of the canary block, the canary block 18 may be identified as a modified canary block 24 (i.e., signaling a potential storage attack).

In one embodiment, the monitoring of the canary blocks 18 by the processor circuitry 14 to identify modified canary block(s) 24 may include receiving a notification 48 from a driver 50 when one of the canary blocks 18 has been modified. For example, the driver 50 may be triggered when any one of the canary blocks 18 is modified. In one example, the driver 50 includes a table of identifiers (e.g., locations) of the canary blocks 18. When a write operation is performed to the memory 12, the driver 50 may compare an identifier of the memory block 16 that is being written to the table of identifiers. If the identifier of the memory block 16 is stored in the table of the identifiers, the processor circuitry 14 may be notified of the modification by the driver 50.

As described above, the processor circuitry 14 performs a backup of the memory blocks 16 at the block level (i.e., as opposed to the file level). The processor circuitry 14 may generate a backup 28 by detecting modifications in the memory blocks 16 and storing a memory block backup 26 of memory blocks 16 that have been modified. The backup 28 may be stored in any suitable location. For example, the backup 28 may be stored in the memory 12 but may be inaccessible to the operating system 20 and other software (e.g., preventing the backup 28 from being corrupted). In another example, the backup 28 may be stored in a separate memory. The memory block backups 26 may be stored for any suitable period of time. The period of time that the backups 26 are stored may also be configurable (e.g., change based on available storage space, etc.).

In one embodiment, the processor circuitry 14 only performs a backup of memory blocks 16 located at the beginning of the memory (e.g., first 10%, 15%, or 20%), e.g., to save storage space. In other embodiments, all memory blocks may be backed up, or only the memory blocks that have been altered since the last backup may be backed up. The backup may be stored on the same volume as the memory blocks or on a different volume (e.g., in the same computer, on another computer, on a server, etc.). The backup may be performed at a specific period (e.g., once per day). Alternatively, a mechanism (such as an interrupt) may notify the processor circuitry 14 of modifications to the memory blocks 16 and the modified memory blocks 26 may be stored. The processor circuitry 14 and the memory 12 may be located in the same device or in separate physical devices. Consequently, in some embodiment, the electronic device 10 may be referred to as a data protection system.

As described above, the processor circuitry 14 monitors the canary blocks 18 to detect modifications. Modified canary blocks 24 may be detected by monitoring a state of the canary blocks 18. The state of the canary blocks 18 may refer to an entropy, hash, or any other suitable method for quantifying a current state of the canary blocks 18 that may be compared to a future state of the canary blocks 18 (i.e., calculated at a later date) to modifications to the canary blocks 18. In one embodiment, the processor circuitry 14 may monitor the canary blocks 18 in a constant fashion or at a set frequency. In another embodiment, accessing a canary block may alert the processor circuitry 14 (e.g., via an interrupt).

The processor circuitry 14 may have various implementations. For example, the processor circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 14 may be located on one or more discrete and separate pieces of hardware. The processor circuitry 14 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 14. The processor circuitry 14 may be communicatively coupled to the computer readable medium and communication interface through a system bus, mother board, or using any other suitable structure known in the art.

The memory 12 may be any suitable computer readable medium, such as one or more of a buffer, a flash memory, a hard drive, a removable media, a volatile memory, a non-volatile memory, a random-access memory (RAM), or other suitable device. In a typical arrangement, the memory 12 may include a non-volatile memory for long term data storage and a volatile memory that functions as system memory for the processor 16. The memory 12 may exchange data with the processor circuitry 14 over a data bus. Accompanying control lines and an address bus between the memory 12 and the processor circuitry 14 also may be present. The memory 12 is considered a non-transitory computer readable medium.

As described above, the memory 12 includes memory blocks 16 configured to store electronic files 22 and metadata 34. For example, the metadata may include permissions, file names, etc. As shown in FIG. 2, each memory block 16 may include one or more electronic files 22 and/or metadata 34. Similarly, each electronic file 22 may be stored in one or more memory blocks 16.

The storage attacks described herein refer to any program designed to affect electronic data stored in a memory 12, such as encryption attacks, ransomwares, and other malicious programs.

Figure 4:
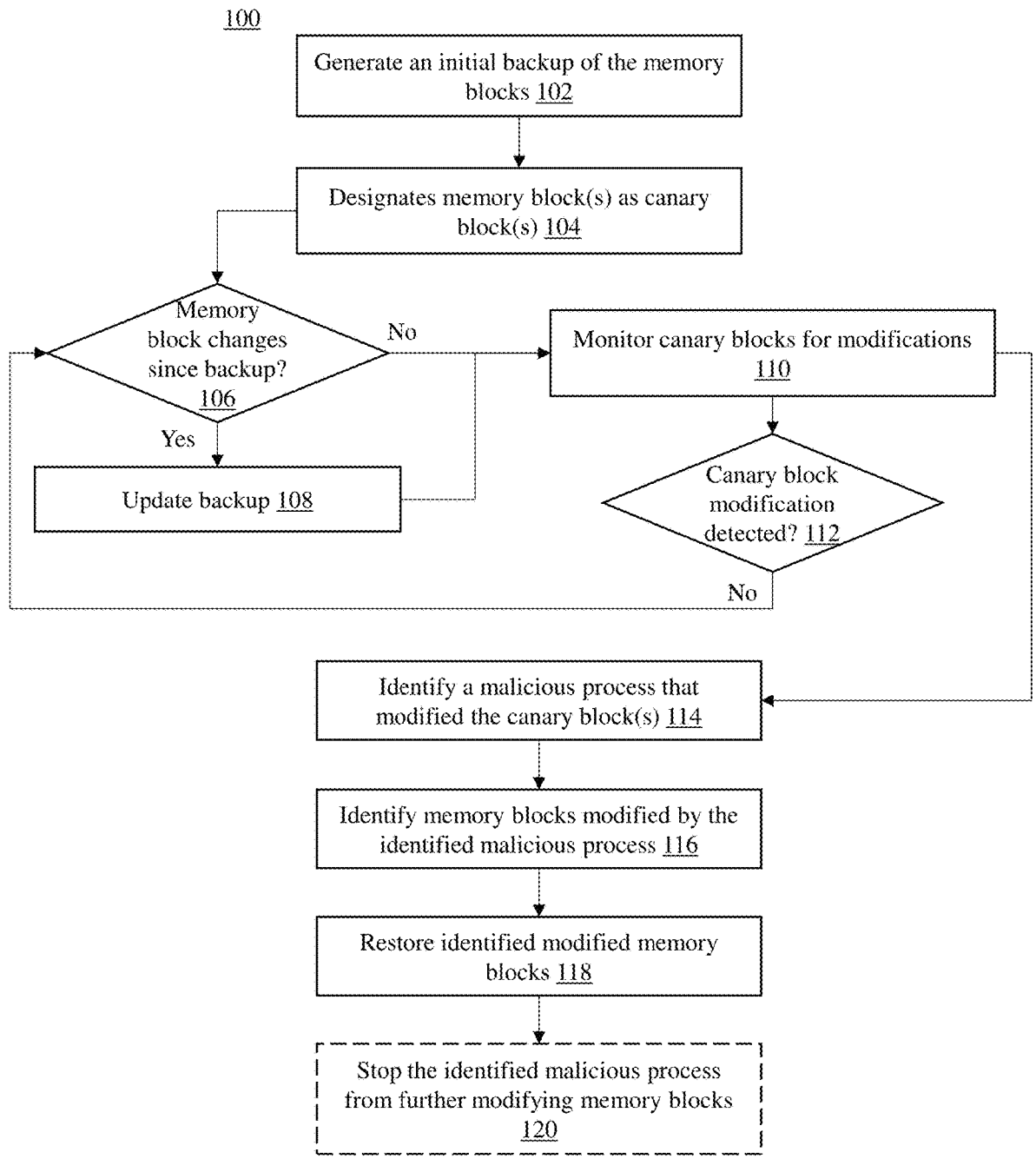
FIG. 4 is a flow diagram of an embodiment of a method for detecting and mitigating a storage attack on memory at the block level.

In the embodiment depicted in FIG. 4, a method 100 implemented by the processor circuitry 14 is shown for detecting and mitigating a storage attack on memory 12 at the block level. In step 102, the processor circuitry 14 generates an initial backup 28 of the memory blocks 16 of the memory 12. In step 104, the processor circuitry 14 designates memory block(s) 16 as canary blocks 18, such that an operating system 20 does not use the canary blocks 16 for storing the electronic files 22.

In step 106, a check is performed to determine if memory blocks 16 have been modified since the last backup. If yes, then in step 108 the processor circuitry 14 updates the backup 28 by storing a memory block backup 36 of memory blocks 16 that have been modified since the last backup.

In step 110, the processor circuitry 14 monitors the canary blocks 18 to identify when one of the canary blocks is modified. In step 112, a check is performed to determine if a storage attack has been detected by the identification of the modified canary block. If yes, processing continues to step 114. If not, processing returns to steps 106.

In step 114, the processor circuitry 14 identifies a malicious process 40 that caused the modification to the modified canary block 24. In step 116, the processor circuitry 14 identifies modified memory blocks 26 that were also modified by the identified malicious process 40. In step 118, the modified memory blocks 26 are restored from the backup 22.

In optional step 120, the processor circuitry 14 stops the identified malicious process 40, such that the identified malicious process 40 is prevented from further modifying the memory blocks 16.

Figure 5:
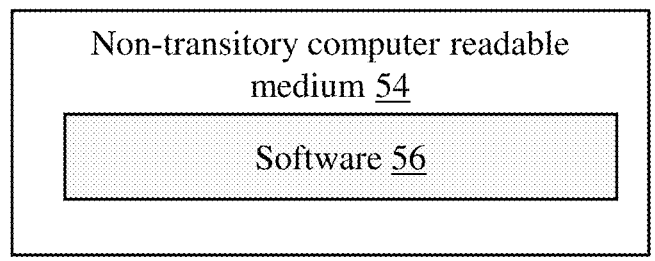
FIG. 5 is a block diagram of an embodiment of a non-transitory computer readable medium storing software for detecting and mitigating a storage attack at the block level when the software is executed by processor circuitry.

Turning to FIG. 5, a non-transitory computer readable memory 54 is shown having software 56 embodied thereon for detecting and mitigating a storage attack at the block level when the software is executed by the processor circuitry 14. The executing of the software 56 may cause the processor circuitry 14 to perform the actions, operations, and method steps described above.

While backing up the memory blocks 16 and monitoring the canary blocks 18 are shown in FIG. 4 as occurring sequentially, these processes may be performed in parallel. For example, the processor circuitry 14 may include separate cores and/or central processing units (CPUs), with one of the cores/CPUs performing the backup and another of the cores/CPUs monitoring the canary blocks 18. In one embodiment, the processor circuitry 14 is spread across separate physical devices. In another embodiment, the processor circuitry 14 is located within the same physical device (e.g., the same computer).

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electronic device for detecting and mitigating a storage attack at the block level, the electronic device comprising:
   a memory including multiple memory blocks at the physical level, wherein electronic files and metadata for the electronic files are stored in one or more of the memory blocks;
   processor circuitry configured to:
      generate a backup by detecting modifications in the memory blocks and storing a memory block backup of memory blocks that have been modified;
      designate one or more of the memory blocks as canary blocks, such that an operating system does not use the canary blocks for storing the electronic files;
      detect the storage attack by monitoring the canary blocks to identify as a modified canary block a modified one of the canary blocks; and
      when the storage attack is detected by the identification of the modified canary block, mitigating the storage attack by:
         identifying a malicious process that caused the modification to the modified canary block;
         identifying modified memory blocks that were also modified by the identified malicious process; and
         restoring from the backup the memory block backup of the identified modified memory blocks, such that the electronic files and the metadata stored in the modified memory blocks are restored.

2. The electronic device of claim 1, wherein the mitigation of the storage attack by the processor circuitry additionally includes stopping the identified malicious process, such that the identified malicious process is prevented from further modifying the memory blocks.

3. The electronic device of claim 1, wherein the processor circuitry designates the canary blocks by at least one of marking the canary blocks as bad blocks or by occupying the canary blocks, such that the operating system does not use the canary blocks for storing the electronic files.

4. The electronic device of claim 1, wherein the canary blocks include one or more memory blocks located at a beginning of the memory, such that detection time of the storage attack is improved when the storage attack begins modifying memory blocks at the beginning of the memory.

5. The electronic device of claim 4, wherein the beginning of the memory comprises the memory blocks located within an initial ten percent of the memory.

6. The electronic device of claim 1, wherein at least one of the canary blocks are randomly chosen or the canary block are chosen based on the memory blocks most likely to be affected by malicious processes.

7. The electronic device of claim 1, wherein the monitoring of the canary blocks by the processor circuitry to identify the modified canary block includes:
   storing an initial entropy of each of the canary blocks at an initial time point;
   calculating a current entropy of each of the canary blocks at a later time point;
   comparing the current entropy and the initial entropy of each of the canary blocks, such that when the current entropy differs from the initial entropy of the canary block the canary block is identified as the modified canary block.

8. The electronic device of claim 1, wherein the monitoring of the canary blocks by the processor circuitry to identify the modified canary block includes receiving a notification from a driver when one of the canary blocks has been modified.

9. A method implemented by processor circuitry for detecting and mitigating a storage attack on memory at the block level, the method comprising:
   generating a backup using the processor circuitry by detecting modifications in memory blocks of the memory and storing a memory block backup of memory blocks that have been modified, wherein the memory includes multiple memory blocks at the physical level and electronic files and metadata for the electronic files are stored in one or more of the memory blocks;
   designating with the processor circuitry one or more of the memory blocks as canary blocks, such that an operating system does not use the canary blocks for storing the electronic files;
   detecting the storage attack with the processor circuitry by monitoring the canary blocks to identify as a modified canary block a modified one of the canary blocks; and
   when the storage attack is detected by the identification of the modified canary block, mitigating the storage attack with the processor circuitry by:
      identifying a malicious process that caused the modification to the modified canary block;
      identifying modified memory blocks that were also modified by the identified malicious process; and
      restoring from the backup the memory block backup of the identified modified memory blocks, such that the electronic files and the metadata stored in the modified memory blocks are restored.

10. The method of claim 9, wherein the mitigation of the storage attack by the processor circuitry additionally includes stopping the identified malicious process by the processor circuitry, such that the identified malicious process is prevented from further modifying the memory blocks.

11. The method of claim 9, wherein the processor circuitry designates the canary blocks by at least one of marking the canary blocks as bad blocks or by occupying the canary blocks, such that the operating system does not use the canary blocks for storing the electronic files.

12. The method of claim 9, wherein the canary blocks include one or more memory blocks located at a beginning of the memory, such that detection time of the storage attack is improved when the storage attack begins modifying memory blocks at the beginning of the memory.

13. The method of claim 12, wherein the beginning of the memory comprises the memory blocks located within an initial ten percent of the memory.

14. The method of claim 9, wherein at least one of the canary blocks are randomly chosen or the canary block are chosen based on the memory blocks most likely to be affected by malicious processes.

15. The method of claim 9, wherein the monitoring of the canary blocks by the processor circuitry to identify the modified canary block includes:
   storing an initial entropy of each of the canary blocks at an initial time point;
   calculating a current entropy of each of the canary blocks at a later time point;
   comparing the current entropy and the initial entropy of each of the canary blocks, such that when the current entropy differs from the initial entropy of the canary block the canary block is identified as the modified canary block.

16. The method of claim 9, wherein the monitoring of the canary blocks by the processor circuitry to identify the modified canary block includes receiving a notification from a driver when one of the canary blocks has been modified.

17. A non-transitory computer readable memory having software embodied thereon for detecting and mitigating a storage attack at the block level when the software is executed by processor circuitry, wherein the executing of the software causes the processor circuitry to:

generate a backup by detecting modifications in memory blocks of the memory and storing a memory block backup of memory blocks that have been modified, wherein the memory includes multiple memory blocks at the physical level and electronic files and metadata for the electronic files are stored in one or more of the memory blocks;

designate one or more of the memory blocks as canary blocks, such that an operating system does not use the canary blocks for storing the electronic files;

detect the storage attack by monitoring the canary blocks to identify as a modified canary block a modified one of the canary blocks; and when the storage attack is detected by the identification of the modified canary block, mitigate the storage attack by:
identifying a malicious process that caused the modification to the modified canary block;
identifying modified memory blocks that were also modified by the identified malicious process; and
restoring from the backup the memory block backup of the identified modified memory blocks, such that the electronic files and the metadata stored in the modified memory blocks are restored.

18. The memory of claim 17, wherein the mitigation of the storage attack by the processor circuitry additionally includes stopping the identified malicious process by the processor circuitry, such that the identified malicious process is prevented from further modifying the memory blocks.

19. The memory of claim 17, wherein the monitoring of the canary blocks to designate the modified canary block includes:

storing an initial entropy of each of the canary blocks at an initial time point;

calculating a current entropy of each of the canary blocks at a later time point;

comparing the current entropy and the initial entropy of each of the canary blocks, such that when the current entropy differs from the initial entropy of the canary block the canary block is identified as the modified canary block.

20. The memory of claim 17, wherein the monitoring of the canary blocks to identify the modified canary block includes receiving a notification from a driver when one of the canary blocks has been modified.

* * * * *